United States Patent
Chen et al.

(10) Patent No.: US 8,144,132 B2
(45) Date of Patent: Mar. 27, 2012

(54) MULTIPOINT SENSING METHOD FOR CAPACITIVE TOUCH PANEL

(75) Inventors: Jian Ting Chen, Changhua County (TW); Paul C. P. Chao, Taipei County (TW); Jyun-Yao Ruan, Changhua County (TW)

(73) Assignee: National Chiao Tung University, Hsinchu (TW)

( * ) Notice: Subject to any disclaimer, the term of this patent is extended or adjusted under 35 U.S.C. 154(b) by 672 days.

(21) Appl. No.: 12/345,632

(22) Filed: Dec. 29, 2008

(65) Prior Publication Data

US 2010/0117981 A1 May 13, 2010

(30) Foreign Application Priority Data

Nov. 7, 2008 (TW) ................................ 97143196 A

(51) Int. Cl.
G06F 3/045 (2006.01)
(52) U.S. Cl. ......................................................... 345/174
(58) Field of Classification Search .................. None
See application file for complete search history.

(56) References Cited

U.S. PATENT DOCUMENTS

| 4,704,501 | A | * | 11/1987 | Taguchi et al. | 345/173 |
|---|---|---|---|---|---|
| 5,283,556 | A | * | 2/1994 | Ise | 345/174 |
| 5,606,346 | A | * | 2/1997 | Kai et al. | 345/173 |
| 5,642,134 | A | * | 6/1997 | Ikeda | 345/174 |
| 6,466,036 | B1 | | 10/2002 | Philipp | |
| 2007/0229470 | A1 | * | 10/2007 | Snyder et al. | 345/173 |
| 2007/0257890 | A1 | | 11/2007 | Hotelling et al. | |
| 2009/0256816 | A1 | * | 10/2009 | Kim | 345/174 |
| 2010/0110022 | A1 | * | 5/2010 | Chen et al. | 345/173 |
| 2010/0110040 | A1 | * | 5/2010 | Kim et al. | 345/174 |

* cited by examiner

*Primary Examiner* — Peter Vincent Agustin
(74) *Attorney, Agent, or Firm* — Browdy and Neimark, PLLC

(57) ABSTRACT

A multi-point sensing method used in a capacitive touch panel is disclosed to detect the voltage variation of every electrode patterned on two parallel electrode layers by means of a capacitive sensing circuit, and measure the vertical capacitance at the intersection crossed by the electrodes of the two electrode layers where the voltage variation is detected, and then compare the vertical capacitance thus measured with the initial vertical capacitance at the same intersection before touch, as a result, the intersection corresponding to the measured vertical capacitance can be determined as the touch point when the comparison result shows different.

17 Claims, 4 Drawing Sheets

MULTIPOINT SENSING METHOD FOR CAPACITIVE TOUCH PANEL

BACKGROUND OF THE INVENTION

1. Field of the Invention

The present invention relates to touch panel technology and more particularly, to a multipoint sensing method for capacitive touch panel.

2. Description of the Related Art

A touch panel technology of capacitive type is capable of recognizing the touch of a human body by means of detecting the variation of capacitance. The touch panel is normally comprised of electrode arrays and a capacitive sensing circuit. When sensing signals are inputted onto a top electrode layer and a bottom electrode layer of the electrode arrays, the capacitive sensing circuit detects the specific capacitance of a plurality of capacitors which are formed between the two electrode layers and located at each intersection crossed by row electrodes and column electrodes patterned respectively on the two electrode layers. Therefore, the capacitive sensing circuit can judge whether any human touch happened on the touch panel to cause an equivalent change of the capacitance during the process of reading the capacitance at every intersection.

While determining the touch point and reading the relatively capacitance, the capacitive sensing circuit needs to obtain the current flows of the electrodes across the respective touch point and to measure the respective capacitance after the electrodes have been recharged to stable charge distribution. If the touch panel has a big size or needs to proceed the detection of multiple touch points, the parasitic resistance presenting in the current path may affect the detection signals for determination of the touch point, extend the charging time of the electrode capacitance and thereby causing an extension of the response time of the capacitive sensing circuit, and give rise to noise interference with the detection signals along the charge transfer path as well as decrease the S/N ratio (signal-to-noise ratio) of the detection signals measured by the capacitive sensing circuit. Taking an example as regular transparent electrodes applied for conducting wires of touch panel and made from ITO (indium-tin oxide) material, which having a higher resistive component than other regular metal wires and with a relatively increasing rate of the resistance subject to increase the touch panel size, the resistive factor of the ITO material results in low response speed of the capacitive sensing circuit, and additional sensing circuits will be required if it is necessary for accelerating the response speed. However, increasing the number of sensing circuits greatly increases the circuit installation space and manufacturing cost. In case of using a different electrode material to decrease the resistance in the charge transfer path, electrode materials currently available on the market do not have as high transmittance for visible light as ITO electrodes to maintain light transparency required for the touch panel.

US 2007/0257890A1 discloses a controller for touch panel, which needs to provide an ASIC (Application Specific Integrated Circuit) to interface with a digital signal processor (DSP) in executing multipoint sensing. To solve the problems resulted from the parasitic resistance existing in the transparent electrode material, the ASIC includes detecting signals of multiple waveforms outputted with different frequencies for noise-free signal can be detected, a demodulation circuit for filtering noise, and a time delay circuit to match with delayed capacitive response time so as to raise the sensing accuracy. The ASIC further includes charge amplify means, charge conversion means and static capacitance offset means. Therefore, the circuit structure of this ASIC is complicate and expensive to manufacture, increasing the manufacturing cost of the touch panel.

U.S. Pat. No. 6,466,036B1 provides a logic control circuit with sensing capacitors and multiple switching devices coupled with the capacitors to have the charge variation related to the touching event on a touch panel be directly converted into a logic output for determination of touch point. This technique simplifies the circuit structure and saves much time in waiting for charge re-distribution of the capacitance. However, when this technique is used for multiple touch points application, more number of switch devices and sensing capacitors must be provided, increasing circuit installation space and manufacturing cost as well.

SUMMARY OF THE INVENTION

The present invention has been accomplished under the circumstances in view. It is therefore a main objective of the present invention to provide a multipoint sensing method for capacitive touch panel, which is a low-noise and rapid-response sensing method satisfying the detecting requirements of big size touch panels. Another objective of the present invention is to provide the multipoint sensing method applied with only a few number of sensing circuits to achieve rapid detection of the whole touch panel, saving the manufacturing cost of circuit fabrication.

To achieve these objectives of the present invention, the multipoint sensing method uses a capacitive sensing circuit to detect the voltage variation of a plurality of first electrodes and second electrodes, which are electrically insulated with each other, and where the voltage variation is happened, the capacitive sensing circuit measures the vertical capacitance at the intersected point that is crossed by and between the detected first electrode and second electrode and then compares the vertical capacitance thus measured with the initial vertical capacitance thus measured before touch event at the same intersected point to determine the points to be touched when the comparison result shows a difference. This method eliminates the procedure of the prior art technique to consequently detect the vertical capacitance at every intersected point between the first electrodes and the second electrodes, thus saving much sensing time. Further, according to the multipoint sensing method of the present invention, one single capacitive sensing circuit can achieve rapid detection of the whole touch panel, and therefore the invention saves much of the circuit manufacturing cost.

DETAILED DESCRIPTION OF THE INVENTION

Figure 1:
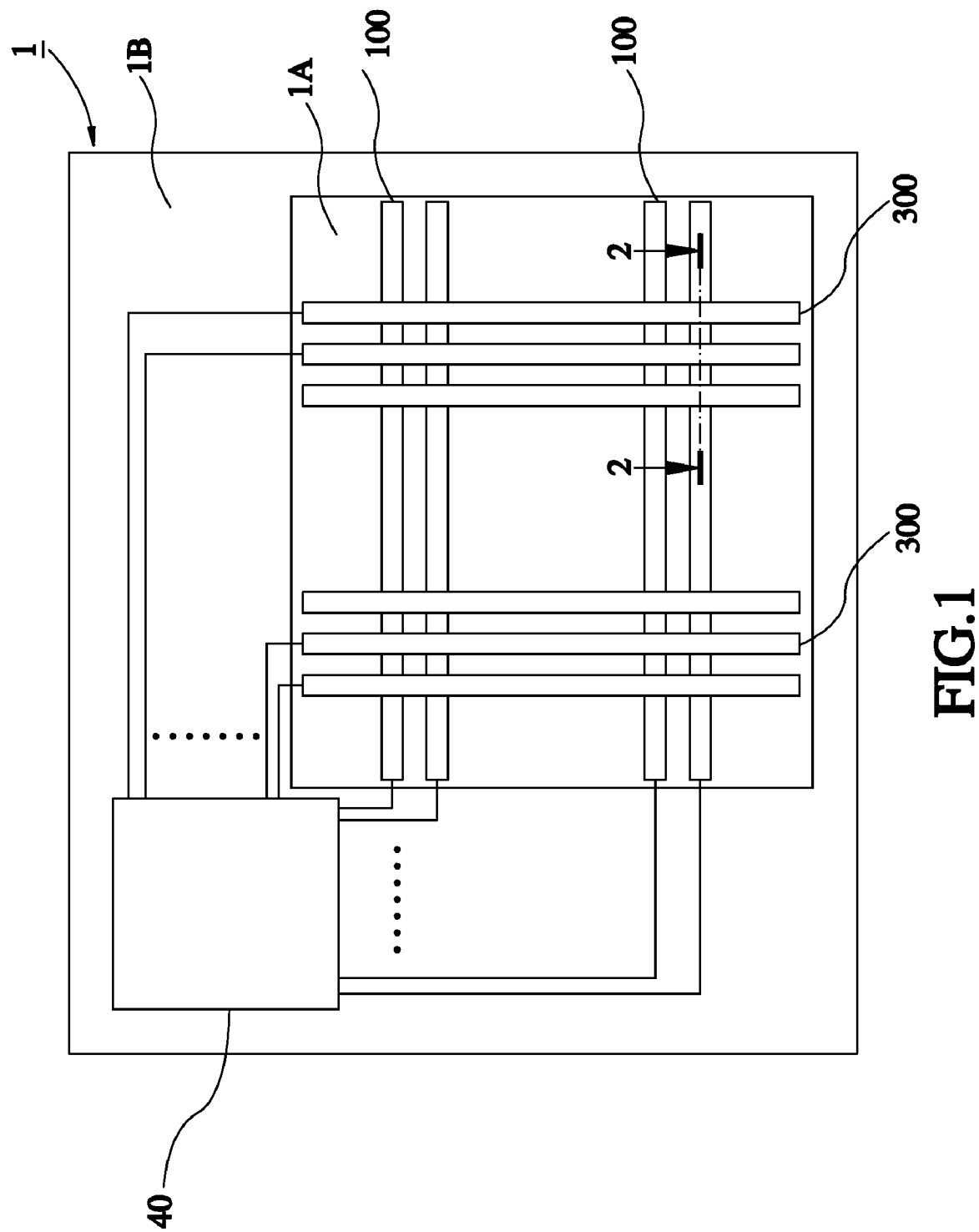
FIG. 1 is a schematic structural view of a capacitive touch panel embodying the present invention.
Figure 2:
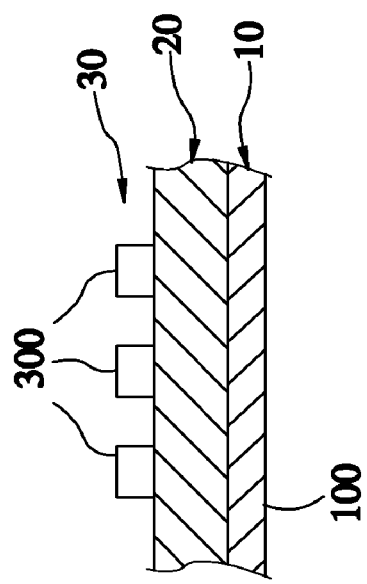
FIG. 2 is a sectional view taken in an enlarged scale along line 2-2 of FIG. 1.

Referring to FIGS. 1 and 2, a touch panel 1 is shown comprising a display region 1A and a peripheral circuit region 1B. The display region 1A is a touch-sensing region, comprising a bottom electrode layer 10, a top electrode layer 30, and an insulation layer 20 sandwiched between the bottom electrode layer 10 and the top electrode layer 30. The peripheral circuit region 1B comprises a capacitive sensing circuit 40 for detecting and recognizing the sensed touch points of the display region 1A. The bottom electrode layer 10 has row electrodes 100 arranged in parallel at a predetermined interval and extending to the peripheral circuit region 1B for electrical connection to the capacitive sensing circuit 40. The insulation layer 20 is made of an electrically insulated material, and adapted to isolate the bottom electrode layer 10 and the top electrode layer 30. The top electrode layer 30 has column electrodes 300 arranged in parallel at a predetermined interval and orthogonal to the row electrodes 100 within the display region 1A, and extending to the peripheral circuit region 1B for electrical connection to the capacitive sensing circuit 40 as well. Therefore, the row electrodes 100 and the column electrodes 300 can obtain electric potential from the capacitive sensing circuit 40 so that capacitive characteristics can be formed by adjacent row electrodes 100, adjacent column electrodes 300, or intersected row and column electrodes 100 and 300. Except the aforesaid properties, the material adapted for the bottom electrode layer 10, the insulation layer 20 and the top electrode layer 30 preferably has excellent light transmittance, that makes the touch panel 1 not only able to transmit sensed touch message to the capacitive sensing circuit 40 for recognition but also capable of installing on the display panel of a flat-panel display device to let the capacitive sensing circuit 40 transmit the sensed touch message to the flat-panel display device for driving to display the touch message at the respective touch point.

Figure 3:
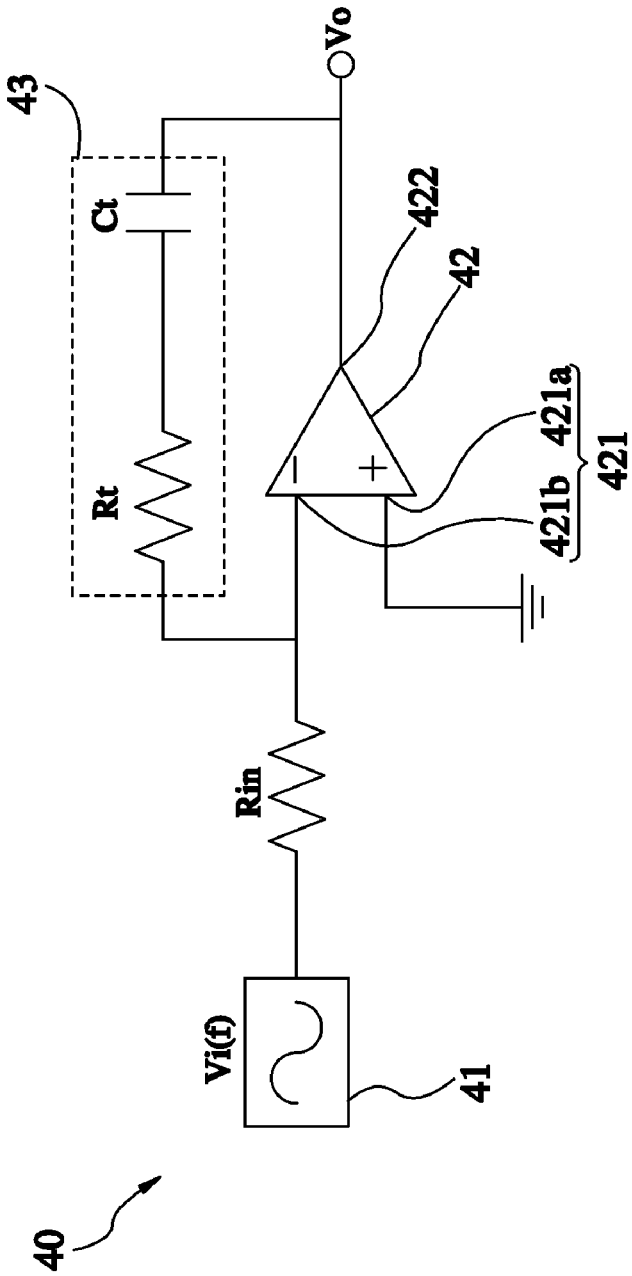
FIG. 3 is a circuit diagram of the preferred embodiment of the present invention.
Figure 4:
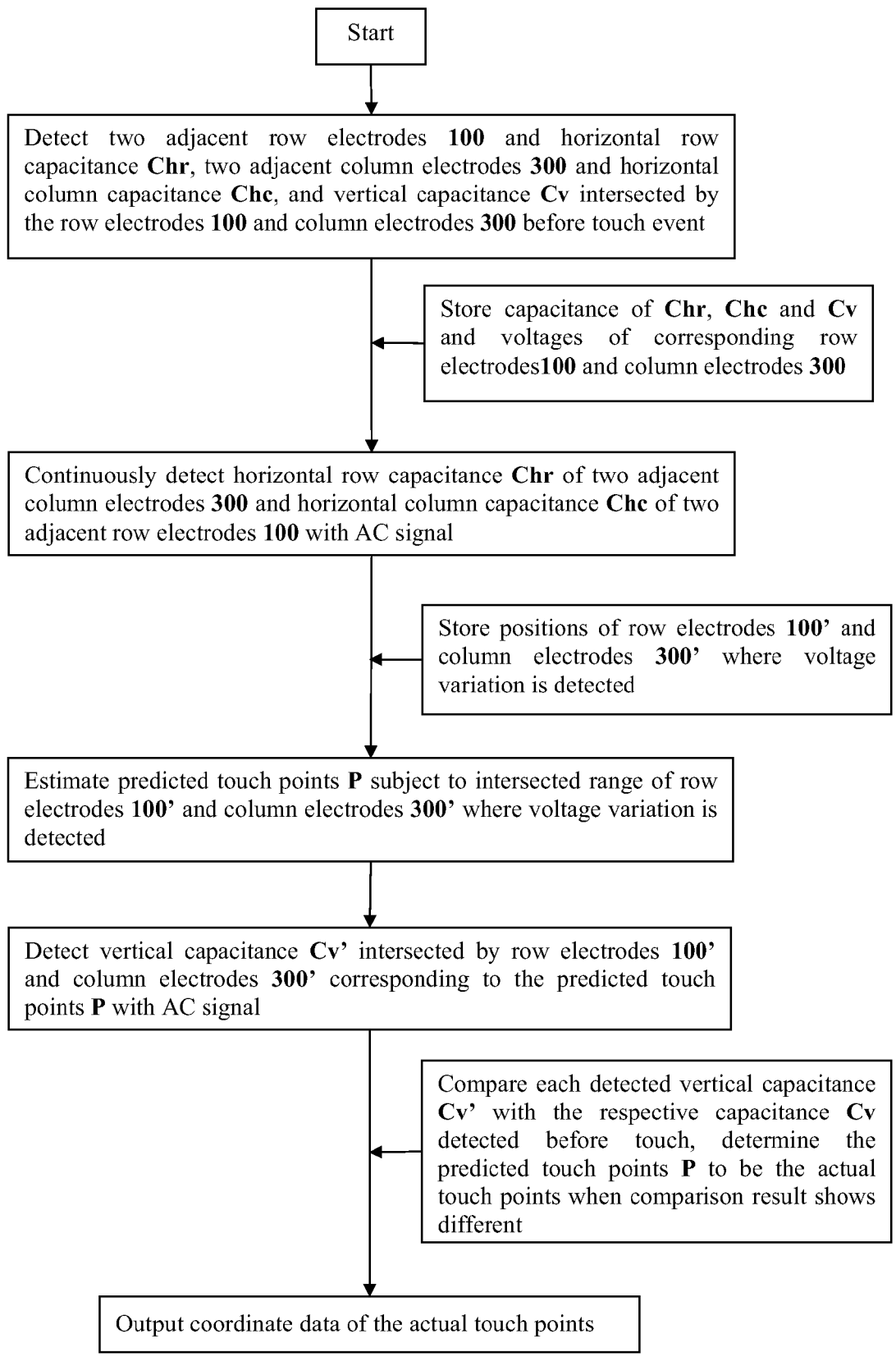
FIG. 4 is an operation flow chart of the preferred embodiment of the present invention.

The capacitive sensing circuit 40 controls starting of detection and storing the potential voltage of the row electrodes 100 and column electrodes 300 and each capacitance of adjacent row electrodes 100, adjacent column electrodes 300, and intersected row electrodes 100 and column electrodes 300. Referring to FIG. 3, the capacitive sensing circuit 40 functions with the row electrodes 100 and the column electrodes 300 as a circuit structure similar to an integrating amplifier for filtering ambient high-frequency noises effectively, therefore, the equivalent circuit model of the circuit structure comprises a signal generator 41, an amplifier 42 and an input resistance Rin. The signal generator 41 is adapted to generate an AC signal Vi in the waveform as sine, square, or other pulses of alternating polarity with a specific frequency f. The sensing frequency f has a great dependent on the detection speed of sensing variable capacitance, preferably providing a sine wave signaling higher than 10 k Hz to meet capacitance variation and high speed detection requirement. The amplifier 42 is constructed as a negative feedback amplifier having two input ends 421, including a high input end 421a electrically connected to ground and a low input end 421b electrically connected to the signal generator 41 via the input resistor Rin, and one output end 422 feedback to the low input end 421b via an equivalent resistance Rt and an equivalent capacitance Ct formed by the two adjacent row electrodes 100, the two adjacent column electrodes 300 or each intersected row and column electrodes 100 and 300. When the signal generator 41 generates an AC signal Vi with frequency f, the output end 422 of the amplifier 42 produces an output voltage Vo=Vi*[(Rt/Rin)+1/(2π*f*Rin*Ct)]. Thus, as shown in FIG. 4, the sensing method of controlling the touch panel 1 runs subject to the steps as follows:

1. After start-up, the signal generator 41 outputs an AC signal Vi to provide electric potential alternately to the two adjacent row electrodes 100, two adjacent column electrodes 300 and each intersected row and column electrodes 100 and 300, which inducing a horizontal row capacitance Chr, a horizontal column capacitance Chc and a vertical capacitance Cv respectively, and thereby obtaining a corresponded output voltage Vo at the output end 422 of the amplifier 42.

2. The capacitive sensing circuit 40 stores the output voltage Vo of the coupled row electrodes 100 and column electrodes 300 corresponding to the horizontal row capacitance Chr, the horizontal column capacitance Chc and the vertical capacitance Cv, and then calculates and stores the values of the horizontal row capacitance Chr, the horizontal column capacitance Chc and the vertical capacitance Cv before touch.

3. The signal generator 41 continuously outputs the AC signal Vi to scan the horizontal row capacitance Chr and the horizontal column capacitance Chc of each two adjacent row electrodes 100 and each two adjacent column electrodes 300 in proper order. When either a human body or a touch-sensing tool touches the touch panel 1, which means for introducing a respective grounding current or potential signal to change the electric potential of the touched electrodes 100 or 300 and affect the related capacitance coupled with the touched electrode 100 or 300, the output voltage Vo is changed once the AC signal Vi passes through the related row electrodes 100' and column electrodes 300' that crossing the touch points. After comparison with the output voltage of the respective row electrodes 100 and column electrodes 300 stored before touch in step 2, the position data of the row electrodes 100' and column electrodes 300' corresponding to the changed output voltage is stored.

Figure 5:
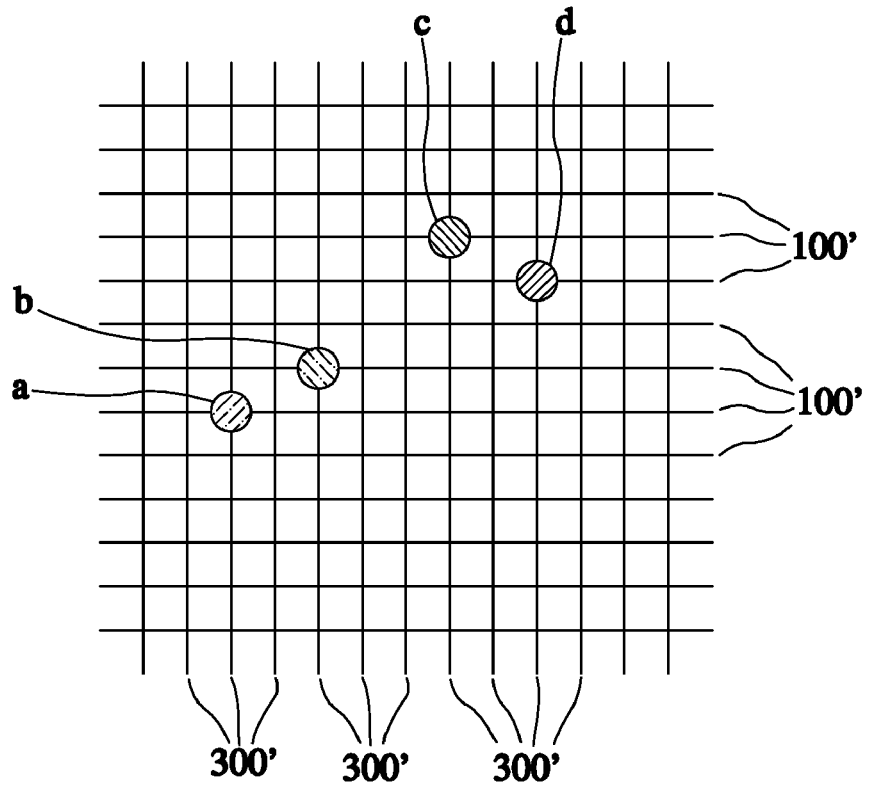
FIG. 5A is a schematic drawing showing the positions of touch points according to the present invention.
FIG. 5B is a schematic drawing showing predicted touch points obtained subject to sensing of the corresponding vertical capacitances according to the present invention.
Figure 5:
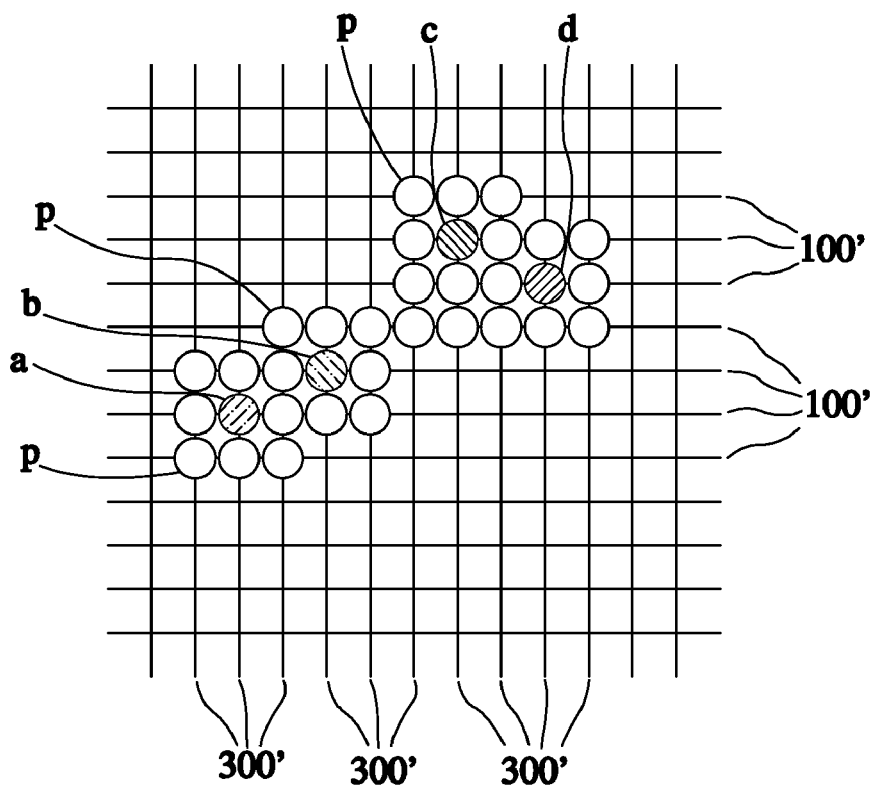

4. According to the position data stored in step 3, predicts the possible touch points within the intersected region of the row electrodes 100' and column electrodes 300' subject to the detected values of the changed output voltages of the row electrodes 100' and column electrodes 300'. For example, if the coordinates of one touch point is (3, 3), the rows stored in the position data of which the output voltage happened to change in step 3 are row 2, row 3 and row 4, and the columns stored in the position data are column 2, column 3 and column 4, thus the coordinates (2, 2), (2, 3), (2, 4), (3, 2), (3, 3), (3, 4), (4, 2), (4, 3) and (4, 4) are the possible touch points. Further, if there are multiple touch points a, b, c, d as shown in FIG. 5A, the equivalent resistance and capacitance of every two adjacent row electrodes 100' and every two adjacent column electrodes 300' electrically coupled with the touch points a, b, c, d can be estimated subject to the respective output voltage gained by the signaling result of the AC signal Vi through the two adjacent row electrodes 100' and the two adjacent column electrode 300' respectively, and in consequence, the possible touch region on each of the row electrode 100' and each of the column electrode 300' is estimated; therefore, once the possible touch region on each of the row electrode 100' and each of the column electrode 300' are cross-matched, all predicted touch points P containing the actual touch points a, b, c, d can be obtained.

5. The signal generator 41 provides AC signal Vi to the row electrodes 100' and column electrodes 300' crossing each of the predicted touch points P, thereby obtaining the vertical capacitance Cv' of each predicted touch point P. The vertical capacitance Cv' of each predicted touch point P is respectively compared with the vertical capacitance Cv calculated subject to step 2, and some of the predicted touch points P are determined to be the actual touch points a, b, c, d if the comparison results show a different, at this time, the coordinates data of each touch point a, b, c, d is outputted.

Therefore, the sensing method provided by the present invention improves the sensing speed. According to conventional techniques, if the touch panel has M columns and N rows, i.e., M*N numbers of vertical capacitances, it takes the sensing time of measuring M*N numbers of individual capacitance to finish sensing the touch panel. By means of the two-step sensing rule, it only requires detecting the horizontal capacitance structure between the adjacent parallel electrodes of N rows and M columns and then measuring the vertical capacitance of every predicted touch point P, thereby greatly shortening the time spent on sensing all of the vertical capacitances on the touch panel. Furthermore, the design of the present invention requires only at least one capacitive sensing circuit to achieve sensing of the whole touch panel, other embodiment of providing four capacitive sensing circuits may be arranged on the four sides of the touch panel. The improvement of sensing speed will be more apparent when the invention is used in a larger sized touch panel, especially the number of circuit components of each capacitive sensing circuit is not increased subject to increasing of the size of the touch panel, as well as saving much more cost on circuit fabrication.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multipoint sensing method used in a capacitive touch panel comprising a first electrode layer and a second electrode layer being electrically insulated and stacked with said first electrode layer, and adapted to sense multiple touch points when a touch event occurs on one of the first electrode layer and the second electrode layer, the multipoint sensing method comprising the steps of:
   a). inputting AC signals to multiple first electrodes of the first electrode layer and multiple second electrodes of the second electrode layer before touch event so as to detect a first capacitance between each two adjacent first electrodes, a second capacitance between each two adjacent second electrodes and a vertical capacitance intersected between one of the first electrodes and one of the second electrodes;
   b). using the AC signal to detect variation of each of the first capacitances and each of the second capacitances, and recording to positions of the respective first electrodes and second electrodes which correspond to the first capacitances and the second capacitances that are changed; and
   c). using the AC signal to measure the vertical capacitance at each of the positions intersected by the respective first electrode and second electrode recorded in step b), and comparing the vertical capacitance thus obtained with the vertical capacitance measured in step a), and determining the intersected positions to be the touch points when the respective comparison result shows a difference.

2. The multipoint sensing method as claimed in claim 1, further comprising a capacitive sensing procedure for measuring one of the first capacitance, the second capacitance and the vertical capacitance, the capacitance sensing procedure is to provide a negative feedback amplifier having one of the first capacitance, the second capacitance and the vertical capacitance to be a feedback loop for respectively measuring one of the first capacitance, the second capacitance and the vertical capacitance.

3. The multipoint sensing method as claimed in claim 2, wherein the amplifier comprises a high input end electrically grounded, a low input end adapted to receive the AC signal, and an output end for feeding output signal back to the low input end.

4. The multipoint sensing method as claimed in claim 3, wherein the low input end and the output end of the amplifier are respectively electrically connected to two adjacent first electrodes of the first electrode layer during sensing each of the first capacitances.

5. The multipoint sensing method as claimed in claim 3, wherein the low input end and the output end of the amplifier are respectively electrically connected to two adjacent second electrodes of the second electrode layer during sensing each of the second capacitances.

6. The multipoint sensing method as claimed in claim 3, wherein the low input end and the output end of the amplifier are respectively electrically connected to one of the first electrode and one of the second electrode during sensing each of the vertical capacitances.

7. The multipoint sensing method as claimed in claim 2, further comprising a step of providing an input resistor electrically connected with the feedback loop of the amplifier for constructing an integrating amplifier with one of the first capacitance, the second capacitance and vertical capacitance.

8. The multipoint sensing method as claimed in claim 1, wherein the step of detecting variation of the first capacitance is to input the AC signal to one of the two adjacent first electrodes and then to detect the voltage variation of the other one of the two adjacent first electrodes.

9. The multipoint sensing method as claimed in claim 8, further comprising the step of estimating the variation of the equivalent resistance and equivalent capacitance of the two adjacent first electrodes according to the detected voltage variation for evaluating the region on the first electrodes adjacent to the touch point.

10. The multipoint sensing method as claimed in claim 8, wherein the method of detecting the variation of the second capacitance during step b) is to input the AC signal to one of the two adjacent second electrodes and then to detect the voltage variation of the other one of the two adjacent second electrodes.

11. The multipoint sensing method as claimed in claim 10, further comprising the step of estimating the variation of the equivalent resistance and equivalent capacitance of the two adjacent second electrodes according to the detected voltage variation for evaluating the region on the second electrodes adjacent to the touch point.

12. A multipoint sensing method used in a capacitive touch panel comprising a plurality of first electrodes arranged on a first plane in a first direction and a plurality of second electrodes arranged on a second plane in a second direction, and adapted to sense multiple touch points when touch event occurs on the touch panel, the multipoint sensing method comprising the steps of:
   a) calculating and storing an initial vertical capacitance at every intersection crossed by each of the first electrodes and each of the second electrodes;
   b) monitoring the voltage variation of the first electrodes and the second electrodes and recording the position where causing the voltage variation; and
   c) detecting each vertical capacitance intersected by the first electrodes and the second electrodes which crossing the recorded position, and comparing the detected vertical capacitance with the initial vertical capacitance stored in step a) respective to the recorded position, and then determining the intersection corresponding to the detected vertical capacitance to be the touch point when the comparison result shows different.

13. The multipoint sensing method as claimed in claim 12, wherein the method of detecting the voltage variation of the first electrodes is to input an AC signal to one of two adjacent first electrodes and then to read the output voltage from the other one of the two adjacent first electrodes.

14. The multipoint sensing method as claimed in claim 13, further comprising the step of providing a negative feedback amplifier for having the two adjacent first electrodes to be a feedback loop of the negative feedback amplifier.

15. The multipoint sensing method as claimed in claim 14, wherein the amplifier comprises a high input end electrically grounded, a low input end for receiving AC signal, and an output end for feeding output signal back to the low input end.

16. The multipoint sensing method as claimed in claim 12, wherein the method of detecting the voltage variation of the second electrodes is to input an AC signal to one of two adjacent second electrodes and then to read the output voltage from the other one of the two adjacent second electrodes.

17. The multipoint sensing method as claimed in claim 16, further comprising the step of providing a negative feedback amplifier for having the two adjacent second electrodes to be a feedback loop of the negative feedback amplifier.

* * * * *